April 3, 1956     A. F. MURTY ET AL     2,740,487
AUTOMOTIVE VEHICLE WITH FORWARDLY SWINGING ENGINE ENCLOSURE
Filed March 31, 1952     5 Sheets-Sheet 1
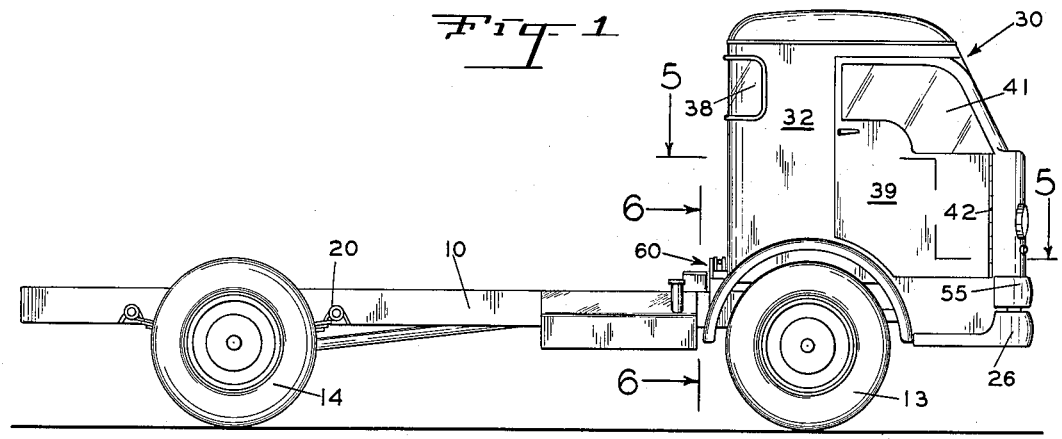
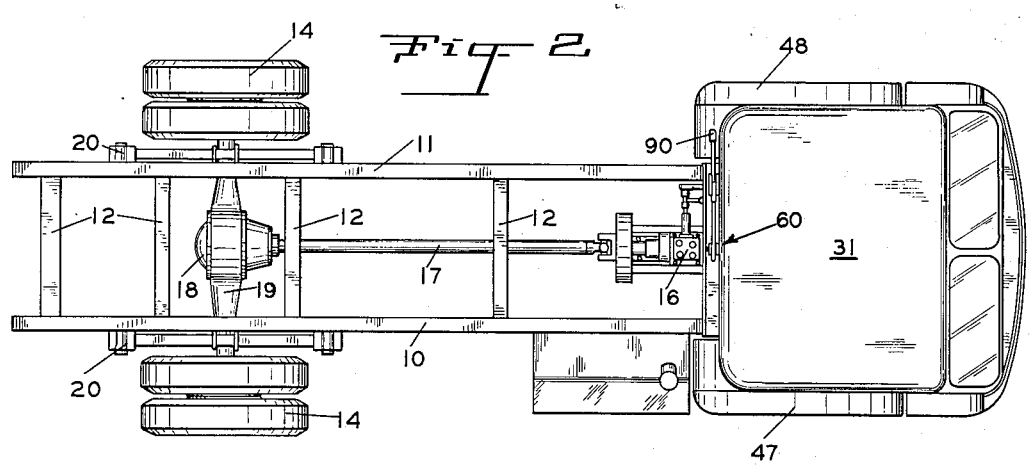
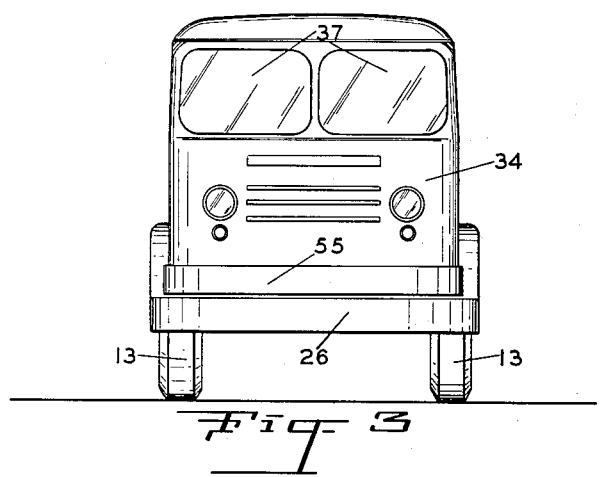
INVENTOR.
ANTHONY F. MURTY
BENEDICT P. MURTY
BY
Buckhorn and Cheatham
ATTORNEYS

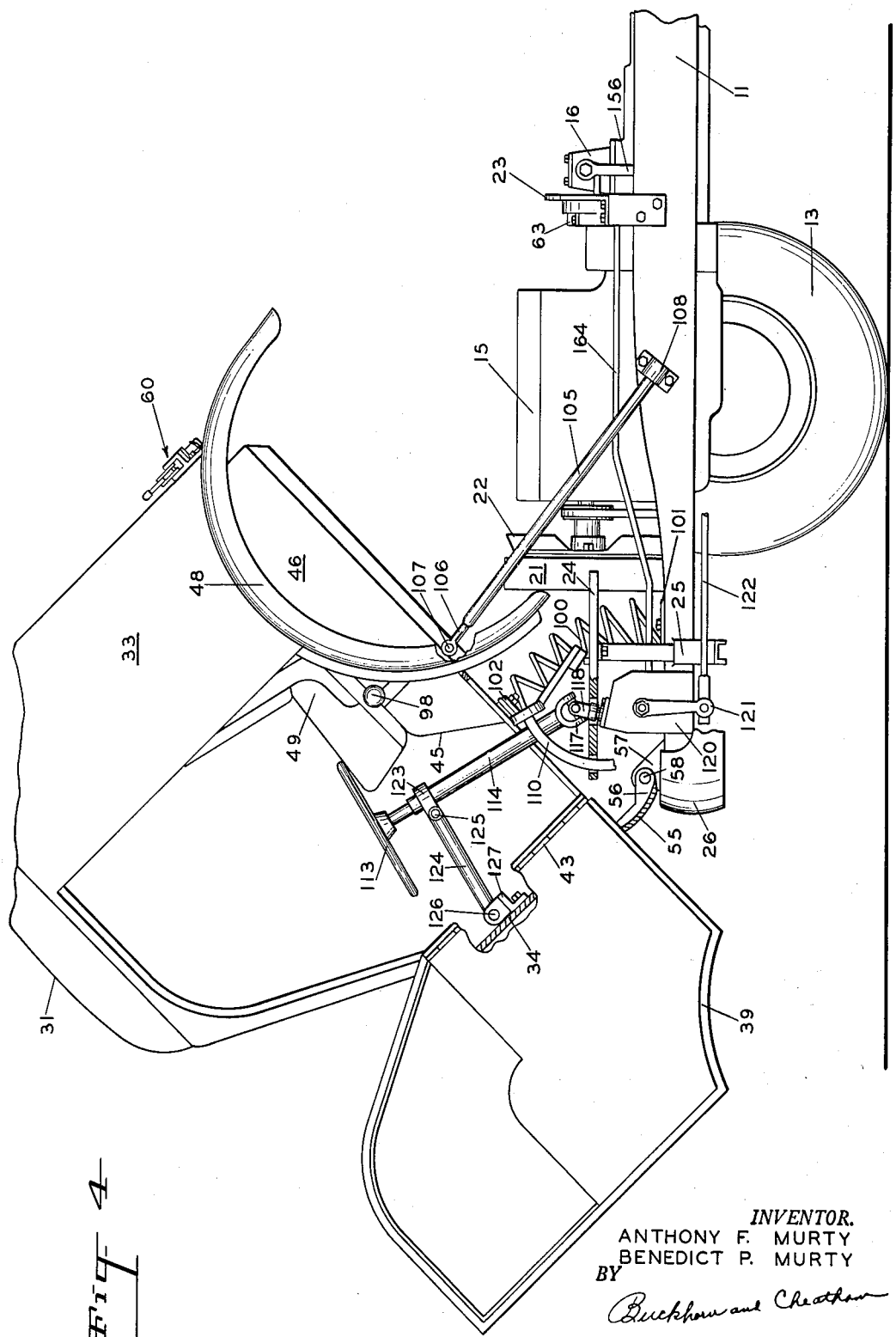

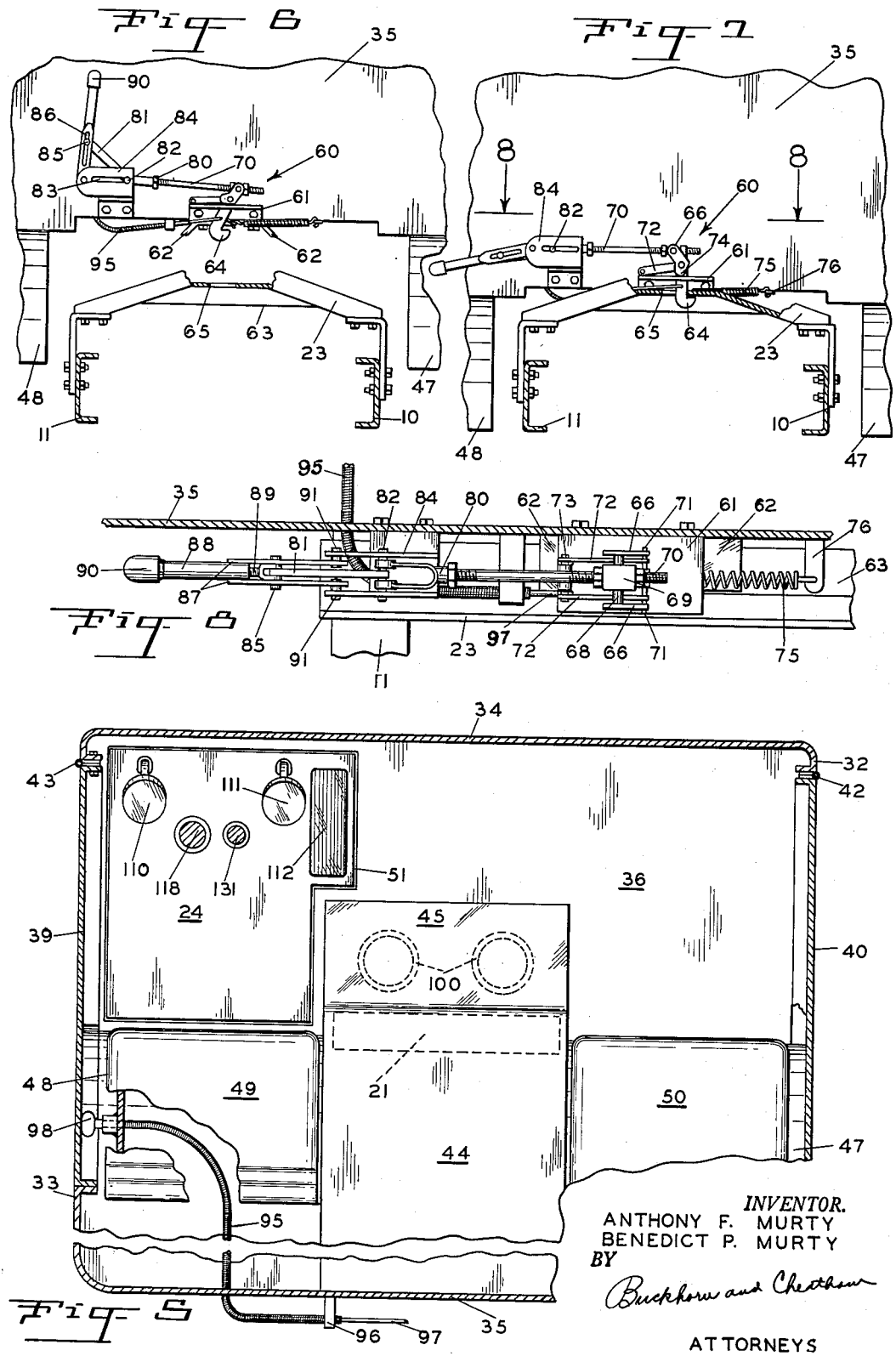

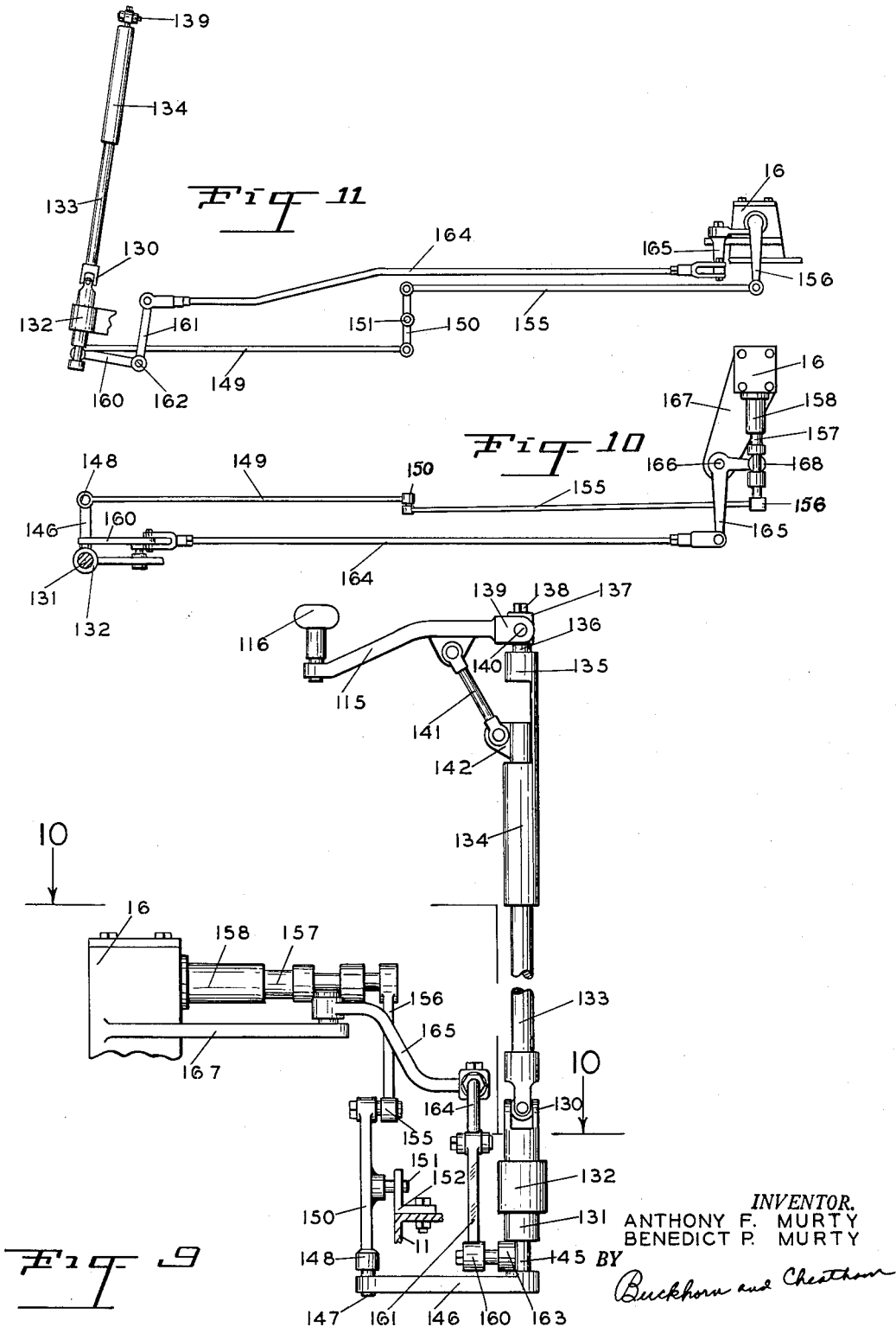

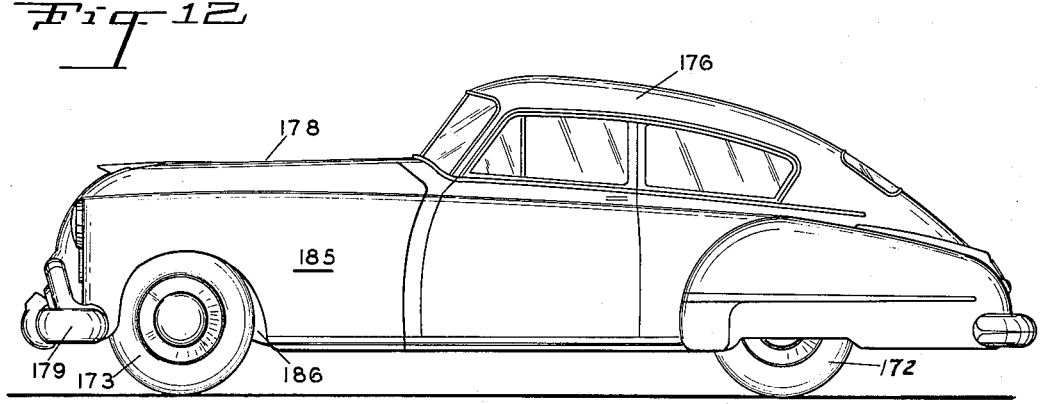
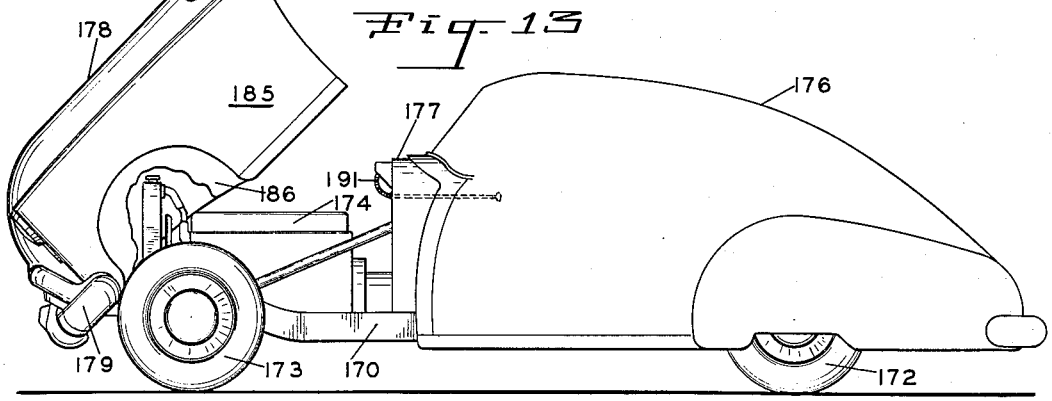
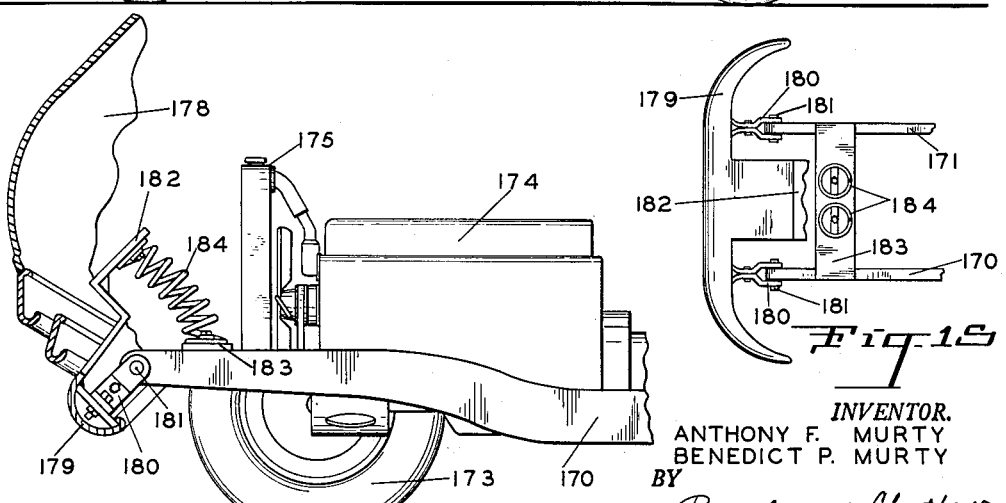

United States Patent Office 2,740,487
Patented Apr. 3, 1956

2,740,487

AUTOMOTIVE VEHICLE WITH FORWARDLY SWINGING ENGINE ENCLOSURE

Anthony F. Murty and Benedict P. Murty, Portland, Oreg., assignors, by mesne assignments, to Diamond T Motor Car Company, Chicago, Ill., a corporation Application March 31, 1952, Serial No. 279,644

8 Claims. (Cl. 180—89)

The present invention relates to an automotive vehicle. A principal object of the present invention is to provide a vehicle with a forwardly swinging superstructure providing an engine housing, the entire housing being movable from a position in housing relation to the engine to a forwardly tipped position permitting ready access to the engine and associated mechanisms. The invention is of particular utility in a cab-over-engine vehicle, but it is likewise applicable to a passenger vehicle or other automotive vehicle wherein the engine is mounted toward the front of the chassis. An aspect of the present invention is that all of the superstructure in the vicinity of the engine may be swung out of the way, all the superstructure, including the fenders and other sheet metal body members, being formed into a unitary structure. A principal purpose of the present invention is to permit ready access to the engine and other mechanism of the vehicle.

An object of the present invention is to provide a vehicle of the foregoing character with spring means for raising the structure surrounding the engine, whereby access to the engine may be had without resort to overhead cranes or the like. In a specific embodiment the invention comprises a forwardly hinged cab having forwardly swinging doors which are hinged at the forward edge of the cab, the weight of the cab and doors being such that the cab will remain in lowered position when the doors are closed but may automatically swing, or be swung, to raised position when the doors are opened and swung forwardly.

A further object of the present invention is to provide a construction of the foregoing character which includes control means for the vehicle, such as a foot brake, a clutch, a throttle, a gearshifting means and steering means including a steering wheel and its supporting steering wheel column, all of which are firmly supported in a cab-over-engine vehicle and which are so arranged that the cab may be swung forwardly without requiring dismantling of any portion of the control means. The foregoing object is attained in part by having the cab of the vehicle include a floor, the floor having an opening therein, and the opening being closed by a stationary platform when the cab is lowered, which platform is included in the support for the control means. This object is also achieved in part by having the steering wheel column and an associated hand-operated gearshift column rise through the openings in the platform and include universal joint connections whereby they may swing with the cab.

A further object of the present invention is to provide improved means for transmitting movement of a gearshift lever mounted upon a steering wheel column to a transmission comprising a part of the engine.

A further object of the present invention is to provide a cab-over-engine vehicle of the type including a forwardly swinging cab with improved latch means to prevent movement of the cab unless the vehicle is stopped and intelligent effort is directed toward moving the cab. This object is attained in part by the provision of a toggle-actuated latch mounted upon the cab and cooperating with a catch mounted upon the frame of the vehicle, and safety means to prevent accidental release of the latch. The foregoing safety means includes a Bowden cable device for holding the latch in closed position and comprising a pull-knob situated in the cab, which pull-knob is held in retracted position by the closed door of the cab. Access to the pull-knob may only be had when the door is open, and since the door is forwardly swinging, the cab cannot be accidentally released when the vehicle is in motion.

A further object of the present invention is to provide a vehicle of the foregoing character including a horizontal floor which may be easily cleaned.

The foregoing and other objects and advantages of the present invention may be more readily understood by reference to the following specification taken in connection with the accompanying drawings wherein like numerals refer to like parts.

In the drawings,

Fig. 1 is a side elevation of a cab-over-engine vehicle constructed in accordance with the present invention;

Fig. 2 is a plan view of Fig. 1;

Fig. 3 is a front elevation of Fig. 1;

Fig. 4 is a side elevation with parts broken away and on an enlarged scale, illustrating the cab in raised position;

Fig. 5 is a horizontal section on an enlarged scale taken substantially along line 5—5 of Fig. 1;

Fig. 6 is a partial vertical section on an enlarged scale taken substantially along line 6—6 of Fig. 1 and illustrating the cab-holding latching mechanism in open condition and the cab partially raised;

Fig. 7 is a view similar to Fig. 6 illustrating the cab-holding mechanism in latched position;

Fig. 8 is a partial vertical section on a further enlarged scale taken substantially along line 8—8 of Fig. 7;

Fig. 9 is a view of the gearshifting mechanism isolated from the remainder of the vehicle, looking rearwardly from a position ahead of the cab;

Fig. 10 is a horizontal view with a part broken away, being taken substantially along the line 10—10 of Fig. 9, and the view being on a reduced scale;

Fig. 11 is a side elevation of the mechanism illustrated in Figs. 9 and 10;

Fig. 12 is a side elevation view of a passenger vehicle incorporating an engine housing constructed in accordance with the present invention;

Fig. 13 is a view similar to Fig. 12 illustrating the engine housing in raised position;

Fig. 14 is a partial view on an enlarged scale corresponding to Fig. 13 and with parts broken away to show the elevating springs; and Fig. 15 is a partial plan view of the frame of the vehicle on a reduced scale.

Figs. 1 to 11 inclusive illustrate a form of the invention comprising a cab-over-engine vehicle. Only so much of the vehicle as is necessary for an understanding of the present invention is herein illustrated, nonessential details having been eliminated in order clearly to illustrate the present invention.

The vehicle herein illustrated comprises a stripped truck chassis, to which may be added any desired type of body construction. The chassis comprises an elongated, longitudinal frame including spaced, parallel channel beams 10 and 11, the beams being connected together by suitable cross braces such as indicated at 12. The frame is supported upon wheels in the usual fashion, front steering wheels being indicated at 13 and rear driving wheels being indicated at 14. An engine 15 is suitably mounted adjacent the forward end of the frame and centrally thereof at a point rearwardly spaced from the front end of the frame, the engine being connected to the driving wheels 14 through suitable means such as a transmission mechanism (not shown) located in a transmission housing 16, propeller shaft 17, a differential mechanism (not shown) located in a differential housing 18, and axle means (not shown) located in an axle housing 19. The axle housing 19 is suitably mounted upon spring assemblies indicated at 20, and other suitable spring assemblies (not shown) are preferably provided to connect the steering wheels 13 to the frame. For the purpose of the present disclosure, the engine is considered as including the transmission mechanism. The engine may be of any desired type, but is herein illustrated as comprising a water-cooled engine supplied with cooling water from a radiator 21 over which air is drawn by a fan 22 driven by the engine. For the purpose of the present disclosure, the frame is considered as including an arched cross brace 23 spanning a rearward portion of the engine just forwardly of the transmission housing 16, and a relatively small platform 24 forming a portion of the floor of the cab of the vehicle, the platform being maintained in fixed position above and parallel to the general plane of the frame by suitable means such as bracket 25. A fixed bumper 26 suitably mounted on the forward ends of the beams 10 and 11 defines the forward end of the frame.

A superstructure made in accordance with the present invention, comprising a cab 30 including a top 31, side walls 32 and 33, a front wall 34, a rear wall 35, and a floor 36, is mounted upon the forward portion of the frame. The front wall 34 is provided with windows 37 and rear wall 35 is provided with a rear window 38. The side walls are provided with access doors 39 and 40, respectively, in which are preferably provided movable glass panes indicated at 41. The doors are hinged to the side walls of the cab structure by means of vertical hinges 42 and 43, respectively, the hinges being adjacent the forward edges of the side walls and the doors swinging forwardly to open positions.

A portion of the bottom of the cab comprises a horizontal floor 36. Rising above the floor is an engine enclosure having a top wall 44, a forwardly sloping, forward wall 45 and vertical side walls 46 inwardly spaced from the side walls of the cab, the housing partially surrounding the engine, radiator and fan, and causing the stream of air created by movement of the vehicle and the fan 22 to be closely confined to the region surrounding the engine 15. The vertical walls 46 form the inner, vertical surfaces of fender constructions, the walls 46 being inside of the upper extremities of the front wheels 13 when the cab is in traveling position. The cab also comprises a pair of laterally spaced, curved members 47 and 48 forming the tops of fenders for the front wheels 13. The left member 48 provides a support for a driver's seat 49 positioned to the rear of the platform 24 and the right member 47 provides a support for an auxiliary seat 50. It is to be noted that the actual floor portion 36 upon which the feet of the occupants rest is horizontal and free from obstruction, so that it may be readily cleaned. The floor portion 36 is provided with an opening 51 into which the platform 24 fits when the cab is in normal, lowered position, so that the platform 24 completes the floor structure of the cab.

The lower front edge of the front wall of the cab is defined by a relatively rigid auxiliary bumper 55 extending parallel to and closely above the upper edge of the main bumper 26. A pair of rearwardly and downwardly directed hinge members 56 are provided on the rear lower edge of the bumper 55, the members being in overlapping relation to a pair of hinge members 57 mounted on the forward ends of the frame members 10 and 11. The hinge members 56 are hingedly connected to the hinge members 57 by hinge pins 58 lying along a horizontal, transverse axis at the front end of the frame, thereby providing hinge means for hingedly connecting the lower front edge of the cab to the forward extremity of the frame in order that the cab may swing forwardly in longitudinal alignment with the frame.

The cab is normally held in latched relation to the frame by means including a manually operable toggle-actuated latching means indicated at 60. The latching mechanism comprises a latch mounting bracket 61 mounted centrally of and at the lower edge of the rear wall 35. A pair of downwardly and outwardly facing feet 62 are mounted beneath the bracket 60 and rest on a lower portion 63 of the brace 23 when the cab is lowered. A hooked latch element 64 extends downward through the bracket 61 in position to project through a slot 65 at the center of the brace 23 when the cab is lowered. The latch 64 projects downwardly from a movable frame including a pair of cam arms 66 pivotally mounted on pins 68 projecting laterally from a slider member 69. The member 69 is movable longitudinally of a threaded rod 70 extending laterally behind the cab, and is locked in adjusted position on the rod 70 by means of nuts at each end. Intermediate portions of the cam arms 66 are pivotally connected by pivot 71 to a pair of links 72 extending parallel to the rod 70 and connected at their other ends to a transverse pivot 73 mounted on the bracket 61. The lower extremities of the arms 66 are formed in the shape of cams, as indicated at 74, which rest upon the upper surface of the bracket 61. The latch 64 depends from the central portion of pivot 71. The construction is such that movement of the rod 70 toward the right to a limit position as illustrated in Fig. 6 lowers the hook due to the rocking of the cam tips 74 of the elements 66 toward the left. The cam tips 74 provide pressure locking of the latch in engagement with the catch portion of the arch brace 23 when the rod 70 is pulled toward the left as seen in Fig. 7. A spring 75 tensioned between an intermediate portion of the latch element 64 and a bracket 76 projecting rearwardly from the wall 35 pulls the hook element toward the right to engage the right edge of the slot through which it passes. The lower surface of the latch element is preferably rounded to cause it to be cammed into the slot 65 if the cab should be lowered prior to alignment of the hook with the slot as described below.

A toggle mechanism for operating the rod 70 comprises the following: The end of the rod 70 projecting toward the left is screwed into a nut mounted on the end of a clevis member 80, the arms of the clevis being pivotally connected to an over-center toggle link 81 by means of a pivot pin 82. The ends of the pivot pin 82 project outwardly through slots 83 in a pair of parallel, vertical plates 84 forming a portion of a bracket mounted on the rear wall 35. The free end of the link 81 carries a pivot pin 85, the ends of which project through longitudinal slots 86 in a pair of elongated, spaced elements 87 rigidly fixed to and extending longitudinally from a lever 88 in the form of a section of pipe. The pivot pin 85 is mounted in a clevis, which is fixed to one end of a threaded rod 89 extending through the member 88 into threaded engagement with a cap nut 90 rotatably mounted on the free end of the pipe section 88, suitable means (not shown) being provided to prevent longitudinal movement of the cap nut 90 with respect to the pipe 88. Rotation of the cap nut 90 therefore produces longitudinal movement of the rod 89 with respect to the lever member 88. The ends of members 87 are pivotally connected by pivots 91 to the plates 84. The construction is such that when the latch is in latching engagement with the catch slot, rotation of the nut 90 in one direction will lock the overcenter link 81 to prevent opening of the latch. In order to open the latch, the nut 90 must be loosened sufficiently to permit overcenter movement of the link 81 to the extent necessary to swing the link above the pivots 91.

Safety means are provided to prevent accidental or even intentional disengagement of the latch unless the door of the cab on the driver's side is opened. Such means comprise a Bowden cable device including an armored sheath 95 suitably mounted in the cab, such as by attaching the same to the support for the seat 49, the rear end of the sheath being anchored in a bracket 96 extending rearwardly from the lower edge of the wall 35. The sheath supports an operating cable 97, one end of which is engaged with the latch element 64 and the other end of which supports a pull-knob 98 projecting laterally from the left side of the operator's seat 49 into engagement with a solid portion of the door 39 when the door is closed. The cable is so arranged that movement of the knob 98 from a retracted position is impossible when the door is closed and when the knob is in retracted position the latch 64 is held toward the right in engaging position as seen in Fig. 7. The arrangement is such that the operator may swing the lever 88 above center but release of the cab must be accomplished by outward movement of the knob 98. This may be effected by an operator standing beside the cab when the door is open, operating the lever 88 with his right hand, and pulling outward on the knob 98 with his left hand.

When the latch mechanism is released, the cab is free to be swung forward about the pivot means 58. However, the cab will remain in engine-enclosing position if the doors are closed, but may be swung forwardly when both doors 39 and 40 are swung forwardly in longitudinal alignment with the side walls of the cab. In a preferred embodiment of the invention the operator must manually raise the cab, but very little effect is required. This results from the balancing of the weight of the cab against the lifting force exerted by spring means, preferably comprising a pair of spiral springs 100, so that the force of the springs is slightly less than the force required automatically to raise the cab when the doors are swung open. It will be noted that the center of gravity of the doors when closed is substantially in lateral alignment with the springs 100 (Fig. 5). When both doors are swung forwardly, the weight thereof is displaced forwardly of the pivot means 58 to aid the thrust of the springs 100 and the cab then may be swung easily to its forwardly tipped position as seen in Fig. 4. The springs 100 are mounted upon a suitable cross brace extending transversely between the frame members 10 and 11, an end thereof being indicated at 101 (Fig. 4). The upper ends of the spring are suitably anchored to a cross brace indicated at 102 extending transversely beneath the forward edge of the sloping wall 45 of the engine enclosure and forming a portion of the floor of the cab. The thrust of the springs 100 is preferably so balanced against the weight of the cab when the doors are swung forwardly, that the cab may not be swung easily when it is occupied by even a relatively light person such as a small child. Therefore the cab must be empty, both doors must be swung forward, and intelligent manipulation of the latch toggle mechanism and the latch safety mechanism comprising the Bowden cable 97 must occur, before the cab swings forwardly.

When the cab is swung forwardly, it is preferably locked in raised position by means of a holding rod 105 having a socket at its upper end into which may be slipped a pin 106 pivotally mounted on a pivot 107 mounted on the wall 46, the opposite end of the holding rod 105 being retained in a socket bracket 108 mounted on the side of the frame member 11. Accidental lowering of the cab when a mechanic is working on the engine is thus prevented.

Control means for the vehicle are mounted in the cab, the same being so devised that disassembly of any portion of the control means is not necessary in order to permit forward tilting of the cab, by reason of which construction immediate access to the engine may be realized when necessary. The control means comprise the usual control means including a clutch pedal 110, a brake pedal 111, a foot treadle throttle 112, a steering wheel 113 mounted at the upper end of a rotatable steering column 114 and gearshifting means including a manually operable gearshift lever 115 provided with an operating handle 116. The lower end of the steering column 114 is connected through a universal joint 117 to an upright stub shaft 118 projecting through an opening in the pathform 24 from a motion-translating device indicated by the box 120 which is suitably mounted on the frame. Crank means 121 depend from the box 120 and are connected to link means 122 extending rearwardly to the steering knuckles or other equivalent mechanism associated with the forward wheels 13. Details of the steering mechanism are not illustrated since such form no part of the present invention and are conventional.

The upper end of the steering column 114 is journaled in a collar 123 which is pivotally connected to a link 124 by means of a transverse pivot 125, the opposite end of the link being connected by a transverse pivot 126 to a bracket 127 mounted on the front wall 34. The construction is such that the wheel and its supporting column may swing with the cab regardless of the angular relation of the wheels 13 with respect to the supporting frame. It is to be noted at this point that the lower ends of the springs 100 are attached to the supporting crossbrace 101 and the upper ends of the springs 100 are attached to the crossbrace 102 so that the springs form resilient limiting means to limit forward swinging of the cab. The normal limit of extension of the springs is reached when the rim of the steering wheel 113 depresses the seat cushion of the seat 49, the seat cushion 49 affording a resilient buffer to retain the cab against further movement in a forward direction, but being incapable of exerting sufficient pressure to harm the steering mechanism.

As illustrated in Figs. 9, 10 and 11, the gearshift lever 115 is mounted at the upper end of an articulated linkage mechanism including a universal joint 130 at the upper end of a rotatable and longitudinally movable member 131 slidably and rotatably mounted in a collar 132 fixed to the steering mechanism housing 120. A rod 133 extends upwardly from the universal joint 130 and is slidably mounted for rotatable and longitudinal movement in a sleeve 134 suitably fixed to the collar 123 supporting the steering column. A portion of the upper extremity of the sleeve 134 is extended upward and supports an overhanging portion 135 upon which is fixed a pivot pin 136 whose axis is in longitudinal alignment with the axis of the rod 133. A pivot block 137 is rotatably mounted on the pin 136 and retained against longitudinal separation therefrom by a bolt 138 threadedly mounted in the end of the pin 136. A clevis 139 at the inner end of the lever 115 is pivotally attached to the rotatable block 137 by pivot members 140. An intermediate portion of the lower surface of the gearshift lever 115 supports a bracket to which is pivoted a clevis link 141, the lower end of which is connected to a bracket 142 at the upper end of the rod 133. The rod 133 may therefore be raised and lowered relative to its supporting sleeve 134 and may be rotated through an arc of movement in the fashion of manual gearshift levers mounted on steering columns.

The lower end of the member 131 is provided with a reduced extension 145 to the tip of which is fixed a crank 146. The free end of the crank 146 carries a ball pin 147, the ball head of which is engaged in a socket 148 at the free end of a longitudinally extending link 149. The rear end of the link 149 is pivotally connected to a vertical lever 150, the central portion of which is supported on a pivot pin 151 mounted in a bracket 152 supported on the frame member 11. The upper arm of the lever 150 is pivotally connected to a longitudinally extending link 155, the rear end of which is pivotally connected to the lower end of a crank 156 which is fixed to the outer end of a selector rod 157 extending laterally through a sleeve 158 into the transmission housing 16.

A bell crank including a forwardly extending arm 160 and a vertically extending arm 161 is pivotally mounted on the frame at 162. The free end of the arm 160 supports a follower roller 163 which is engaged in the annular groove at the lower portion of the member 131 surrounding the reduced portion 145. The upper end of the arm 161 is connected to a longitudinally extending link 164, the rear end of which is connected to the lateral arm 165 of a bell crank pivotally mounted at 166 on a bracket 167 extending laterally from the transmission housing. A longitudinally extending arm of the bell crank carries a follower roller 168 which is mounted between a pair of annular flanges on the selector rod 157. The rod 157 constitutes a gear-selector rod which may be rocked about its longitudinal axis by the crank 156 and shifted longitudinally by the bell crank carrying the roller 168. It is obvious from inspection of the above-described linkage that longitudinal movement of the selector rod 157 corresponds to vertical swinging movement of the manual lever 115, and rocking of the selector rod 157 corresponds to arcuate movement of the lever 115. The selector 157 operates upon conventional gear-shifting mechanism (not shown) located in the housing 16.

Figs. 12 to 15, inclusive, illustrate certain features of the present invention embodied in an automotive vehicle in which the engine hood and attached fenders form a superstructure which may tip forwardly as a unit in order to permit access to the engine, the structure differing from the structure of the preceding modification in that the driver's cab and the controls therein remain stationary. The invention is illustrated in connection with a passenger vehicle comprising a frame including longitudinal members 170 and 171 supported by rear driving wheels 172 and front steering wheels 173. The frame supports a forwardly mounted engine 174 to which is connected a water-cooling radiator 175. A tonneau is mounted on the frame in the usual manner, the tonneau terminating in a forwardly-situated arched crossbrace structure indicated at 177. A forwardly-mounted superstructure, including an engine hood 178 and a bumper 179 at the lower front edge of the hood, is pivotally connected to the frame by a pair of brackets 180 and pivots 181 extending through the forward ends of the frame members. A bracket 182 extends rearwardly from the upper edge of the bumper 179 into overhanging relation to a crossbrace 183 extending between the elongated frame members forwardly of the radiator, and a pair of coil springs 184 are compressed between the brace 183 and the bracket 182. The hood 178 is extended from side to side of the body of the vehicle and vertical side portions thereof provide fender skirts 185. Intermediate vertical portions 186 provide the inner walls of the front fenders into which the front wheels 173 extend. A latch member 190 is mounted centrally beneath the rear edge of the hood 178 and cooperates with suitable catch structure (not shown) on the brace 177 to hold the latch in normal position. A Bowden cable device indicated at 191 extends from the catch mechanism to the interior of the tonneau in order that the latch may be released by the occupant of the vehicle. Details of the catch and Bowden release mechanism are not illustrated since such are common and well known, it being sufficient to state that the cable must be operated to release the catch, and then the latch may be manually swung forward by someone standing alongside the hood in order for the springs 184 to be effective to raise the hood and its associated fender structure.

Having illustrated and described two embodiments of the present invention, it should be apparent to those skilled in the art that the invention permits of modification in arrangement and detail. We claim as our invention all such modifications as come within the true spirit and scope of the appended claims.

We claim:

1. A cab-over-engine vehicle comprising an elongated frame, an engine mounted centrally of said frame near the forward end thereof, a driver's cab supported upon said frame near the forward end thereof and normally enclosing said engine, a door pivotally mounted on said cab at the driver's side thereof, a transverse pivot means connecting the front end of said frame to a lower portion of the front end of said driver's cab whereby said cab may be swung forwardly in longitudinal alignment with said frame, spring means normally compressed between said driver's cab and said frame, said spring means being located rearwardly of said pivot means and exerting a force tending to swing said driver's cab forwardly about said pivot means, a manually operable latch mounted on said cab, a catch engageable by said latch mounted on said frame, and latch safety means extending from said latch into said driver's cab and normally preventing release thereof, said latch safety means comprising an operating member mounted within said cab in an inaccessible position and restrained against movement by said door when said door is closed.

2. A cab-over-engine vehicle comprising a frame, an engine mounted upon said frame near the forward end thereof, a driver's cab normally preventing access to said engine and comprising a unitary structure including front wheel fenders, a driver's seat and a driver's access door adjacent the driver's seat, transverse, horizontal pivot means connecting the front end of said frame to a lower portion of the front end of said driver's cab, spring means normally compressed between said frame and said driver's cab and exerting a force tending to swing said driver's cab upwardly and forwardly about said pivot means to an extent such that said engine is exposed and accessible for servicing, a catch on said frame near the rear of said cab, latch means mounted on the rear of said cab and engageable with said catch to hold said cab in normal position, said latch means comprising a manually engageable operating lever operable by a person standing on the ground at the driver's side of the vehicle, latch safety means comprising a Bowden cable device extending from said latch means into said cab and including an operating handle mounted on said driver's seat and extending into proximity with the driver's access door when closed, said handle being engageable only when said door is open to release said latch safety means and thereby permit release of said latch, and being engageable by a person standing at the side of the vehicle on the driver's side thereof, said spring means exerting a lifting force slightly less than the force required to swing said cab forwardly about said pivot means whereby said cab will remain in normal position even though said latch means is released.

3. A cab-over-engine vehicle comprising an elongated longitudinal frame, an engine mounted on a portion of said frame adjacent the forward end thereof, a cab mounted upon said frame in position to house the upper portion of said engine and including a forwardly swinging door at each side hingedly connected thereto near its forward edge, transverse pivot means interconnecting the forward end of said frame and the lower front portion of said cab, a pair of laterally spaced, coil springs normally compressed between a portion of said frame and a portion of said cab when the cab is in normal position, said springs being located in transverse alignment with the centers of said doors between said engine and said pivot means, said coil springs exerting a force tending to swing said cab upwardly and forwardly about said pivot means, and manually operable latch means on said cab engageable with a portion of said frame for normally preventing pivoting movement of said cab, the weight of said cab and of said doors being greater than the lifting strength of said springs, so that said cab will remain in normal position when said doors are closed, and said weight being only slightly in excess of the lifting strength of said springs whereby when said doors are swung forwardly into alignment with the sides of the vehicle the weight of said cab is almost counterbalanced and said cab may be swung upwardly and forwardly with the aid of a very slight lifting force.

4. A cab-over-engine vehicle comprising a frame, an engine mounted on said frame adjacent the forward end thereof, a cab housing said engine, horizontal, transverse pivot means pivotally connecting the front end of said frame to the lower front edge of said cab whereby said cab may be swung forwardly from housing relation with respect to said engine, said cab including a floor having an opening therein, a stationary platform mounted on said frame and normally closing said opening when said cab is in lowered position, vehicle control means in said cab, said control means rising above said platform and comprising a steering wheel and a rotatable steering wheel column supporting said steering wheel, said steering wheel column comprising a universal joint located above and adjacent said platform and rearwardly of said pivot means whereby said steering wheel column may swing with said cab, and articulated means interconnecting the upper end of said steering wheel column with the forward wall of said cab whereby said steering wheel column will swing with said cab.

5. A cab-over-engine vehicle comprising a frame, an engine mounted on said frame adjacent the forward end thereof, a cab housing said engine, horizontal, transverse pivot means pivotally connecting the front end of said frame to the lower front edge of said cab whereby said cab may be swung forwardly from housing relation with respect to said engine, said cab including a floor having an opening therein, a stationary platform mounted on said frame and normally closing said opening when said cab is in lowered position, vehicle control means in said cab, said control means comprising a steering wheel and a rotatable steering wheel column supporting said steering wheel, said steering wheel column comprising a universal joint located above and adjacent said platform and rearwardly of said pivot means whereby said steering wheel column may swing with said cab, a link hingedly interconnecting the upper end of said steering wheel column with the forward wall of said cab whereby said steering wheel column will swing forwardly with said cab, a gearshift lever mounted on said steering wheel column, and articulated linkage means connecting said gearshift lever with said engine, said linkage means including a universal joint located above and adjacent said platform, alongside of said steering wheel column universal joint, and rearwardly of said pivot means whereby said gearshift lever may swing with said steering post.

6. A cab-over-engine vehicle comprising a frame, an engine mounted on said frame adjacent the forward end thereof, a cab housing said engine, horizontal, transverse pivot means pivotally connecting the front end of said frame to the lower front edge of said cab whereby said cab may be swung forwardly from housing relation with respect to said engine, vehicle control means extending upwardly from said frame into the forward part of said cab, said control means comprising a steering wheel and a rotatable steering wheel column supporting said steering wheel, said steering wheel column comprising a universal joint located above and rearwardly of said pivot means, a collar rotatably journaling an upper portion of said steering wheel column, a link, a first, horizontal, transverse pivot connecting one end of said link to said collar, and a second, horizontal, transverse pivot connecting the other end of said link to said cab above said pivot means whereby said steering wheel column will be caused to swing forwardly with said cab.

7. A cab-over-engine vehicle comprising a frame, an engine mounted on said frame adjacent the forward end thereof, a cab housing said engine, horizontal, transverse pivot means pivotally connecting the front end of said frame to the lower front edge of said cab whereby said cab may be swung forwardly from housing relation with respect to said engine, vehicle control means extending upwardly from said frame into said cab, said control means comprising a steering wheel and a rotatable steering wheel column supporting said steering wheel, said steering wheel column comprising a universal joint located above and rearwardly of said pivot means whereby said steering wheel column may swing with said cab, a collar rotatably journaling an upper portion of said steering wheel column, and linking means pivotally interconnecting the said column with a forward upper part of said cab whereby said steering wheel column will be caused to swing forwardly with said cab.

8. A cab-over-engine vehicle comprising an elongated, longitudinal frame, an engine mounted on a portion of said frame adjacent the forward end thereof, a cab mounted upon said frame in position to house the upper portion of said engine and including a forwardly swinging door hingedly connected thereto near its forward edge, transverse pivot means interconnecting the forward end of said frame and the lower front portion of said cab, spring means normally compressed in upwardly thrusting relation between a portion of said frame and a portion of said cab rearwardly of said pivot means when the cab is in engine housing position, said spring means being located in transverse alignment with a central portion of said door between said engine and said pivot means, said spring means exerting a force tending to swing said cab upwardly and forwardly above said pivot means, and manually releasable latch means on said cab engageable with a portion of said frame for normally preventing swinging movement of said cab, the weight of said cab and of said door being greater than the lifting strength of said spring means so that said cab will remain in normal position when said door is closed, and said weight being only slightly in excess of the lifting strength of said spring means whereby when said door is swung forwardly into alignment with the side of the vehicle the weight of said cab is almost counterbalanced and said cab may be swung upwardly and forwardly with the exertion of slight manual force.

References Cited in the file of this patent

UNITED STATES PATENTS

| | | |
|---|---|---|
| 2,035,895 | Kelly | Mar. 31, 1936 |
| 2,141,267 | Dillon | Dec. 27, 1938 |
| 2,143,983 | Howell | Jan. 17, 1939 |
| 2,148,308 | Spear | Feb. 21, 1939 |
| 2,210,519 | Wollensak | Aug. 6, 1940 |
| 2,246,791 | Dall | June 24, 1941 |
| 2,366,391 | Dodge, Jr. | Jan. 2, 1945 |
| 2,376,491 | Kinney, Jr. | May 22, 1945 |
| 2,502,622 | Harris | Apr. 4, 1950 |
| 2,582,635 | Kipple | Jan. 15, 1952 |
| 2,606,625 | Paton | Aug. 12, 1952 |

FOREIGN PATENTS

| | | |
|---|---|---|
| 542,129 | France | May 12, 1922 |
| 585,235 | Great Britain | Feb. 3, 1947 |
| 38,749 | Switzerland | Jan. 14, 1907 |